UNITED STATES PATENT OFFICE.

KARL HEUMANN, OF ZURICH, SWITZERLAND, ASSIGNOR TO THE BADISCHE ANILIN AND SODA FABRIK, OF LUDWIGSHAFEN, GERMANY.

ARTIFICIAL INDIGO WHITE.

SPECIFICATION forming part of Letters Patent No. 534,560, dated February 19, 1895.

Application filed June 15, 1894. Serial No. 514,697. (No specimens.) Patented in England July 7, 1890, No. 10,509; in Germany July 11, 1890, No. 56,273; in France July 15, 1890, No. 206,982; in Belgium July 28, 1890, No. 91,413; in Austria-Hungary July 28, 1890, No. 3,716 and No. 3,685; in Spain September 17, 1890, No. 11,087; in Italy September 30, 1890, XXIV, 27,992, and LV, 50, and in Russia July 1, 1892, No. 7,410.

*To all whom it may concern:*

Be it known that I, KARL HEUMANN, professor of chemistry and doctor of philosophy, a subject of the Emperor of Germany, residing at Zurich, in the canton of Zurich, Switzerland, have invented new and useful Improvements in the Manufacture of New Artificial Indigo White, (for which patents have been obtained in Germany, No. 56,273, dated July 11, 1890; in England, No. 10,509, dated July 7, 1890; in France, No. 206,982, dated July 15, 1890; in Belgium, No. 91,413, dated July 28, 1890; in Italy, XXIV, 27,992, LV, 50, dated September 30, 1890; in Austria-Hungary, tom. 40, fol. 3,716, XXIV, 3,685, dated July 28, 1890; in Russia, No. 7,410, dated July 1, 1892, and in Spain, No. 11,087, tom. XI, fol. 393, dated September 17, 1890,) of which the following is a specification.

My invention relates to the manufacture of a new artificial indigo-white.

The process consists in, first, preparing phenyl-glycocoll-carboxylic-acid, in the well-known way, by the interaction of one molecular proportion of anthranilic acid and one molecular proportion of mono-chlor-acetic-acid; next in treating this with caustic alkalies or alkaline earths or mixture thereof so as to obtain a product which I term artificial indigo-white. This essentially consists of an intimate mixture or combination of a body having the nature of a leuco-compound, with the excess of the alkali used.

This artificial indigo-white can for instance be applied usefully by dissolving in water and oxidizing whereby blue coloring matter is produced. This can also be effected in the presence of the goods to be dyed so that the blue coloring matter is produced in or upon the fiber.

The following is an example of the manner in which my invention may be carried into effect; the parts are by weight:—Mix about sixty-eight (68) parts anthranilic acid with about forty-seven (47) parts of monochlor-acetic acid and about five hundred (500) parts of water, and boil for about two (2) hours in a vessel fitted with a reflux or inverted condenser. Allow the resulting solution to stand for several hours, when part of the acid produced will have crystallized out. Concentrate the mother liquor by evaporating and so gain a further quantity of the acid. In both cases separate the acid from the mother liquor, subject to the action of a centrifugal machine and dry. The acid is thus obtained in a condition sufficiently pure for use in the process which consists in heating it to a temperature exceeding two hundred degrees centigrade (200° C.) with an excess of a caustic alkali, calcium hydrate (slaked lime) or barium hydrate or mixture thereof I prefer for use caustic potash, thus:—Melt together about one (1) part phenyl-glycocoll-carboxylic acid (obtained as above described or in any other way) with about three (3) parts of caustic potash and about one (1) part of water. Stir well and raise the temperature gradually to about two hundred degrees centigrade (200° C.). At this point the mass begins to turn yellowish. Continue heating raising the temperature gradually, until the intensity of the color no longer increases and the melt is quite liquid. At this point, which is soon reached, the production of my new artificial indigo-white is complete. Allow to cool and grind to powder.

My new artificial indigo-white thus obtained occurs as a brownish or yellowish powder which is readily soluble in water and yields a strongly alkaline solution which turns blue on dilution and exposure to the air. If prepared with caustic lime instead of caustic potash the artificial indigo-white is of course less soluble in water but the products are the same in all essential respects.

Now, what I claim is—

1. The new article of manufacture which I have termed artificial indigo white, which can be derived from phenyl-glycocoll-carboxylic acid and a caustic alkali or alkaline earth and is a brownish or yellowish powder, which gives an alkaline solution on mixture with water, which turns blue on exposure to air and is insoluble in ether and benzene and consists essentially of an intimate mixture or combination of an indigolike-leuco-compound with the excess of alkali or alkaline earth used.

2. The process for the manufacture of what I have termed artificial indigo-white by treating phenyl-glycocoll-octho-carboxylic acid with a caustic alkali or caustic alkaline earth at a temperature exceeding 200° centigrade.

In testimony whereof I have hereunto set my hand in the presence of two subscribing witnesses.

KARL HEUMANN.

Witnesses:
F. P. TREADWELL,
HEIRRICH AUGUST BERNTHSEN.